INVENTORS
THOMAS L. KENDALL
GARTH A. ROWLS
BY
THEIR ATTORNEY

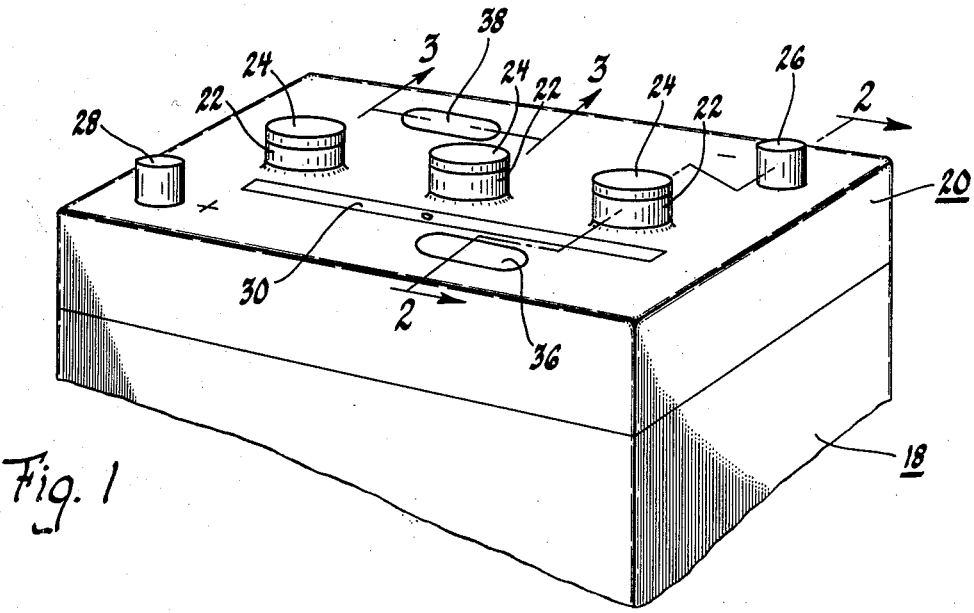
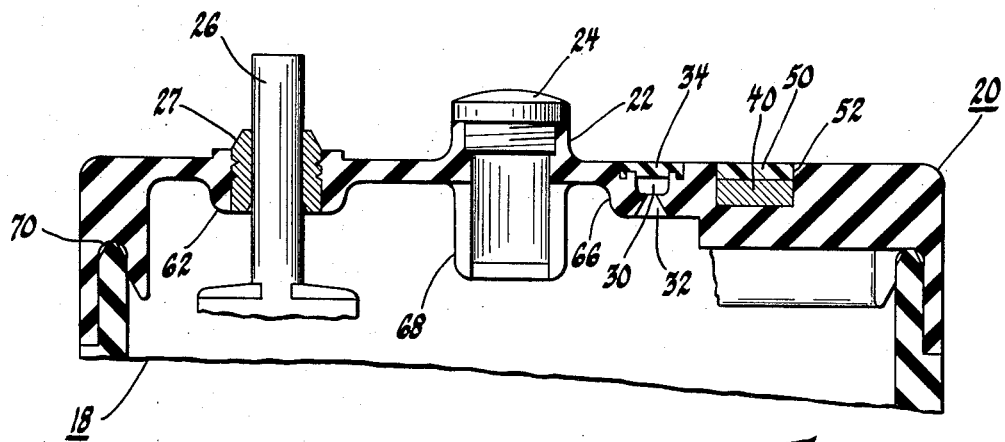
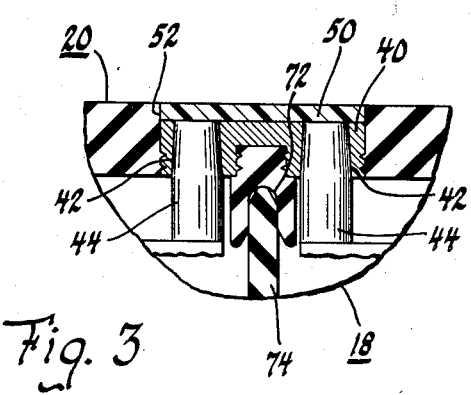
INVENTORS
THOMAS L. KENDALL
GARTH A. ROWLS
BY
THEIR ATTORNEY June 9, 1959 T. L. KENDALL ET AL 2,890,262
STORAGE BATTERY
Filed Nov. 19, 1956 2 Sheets-Sheet 2

United States Patent Office 2,890,262
Patented June 9, 1959

2,890,262
STORAGE BATTERY

Thomas L. Kendall and Garth A. Rowls, Muncie, Ind., assignors to General Motors Corporation, Detroit, Mich., a corporation of Delaware Application November 19, 1956, Serial No. 623,136

2 Claims. (Cl. 136—170)

This invention relates to storage batteries and is particularly concerned with multi-cell storage batteries wherein a one piece cover is used.

It is one of the objects of the invention to provide a one piece cover for the storage battery wherein the cell connectors are molded wholly within the cell cover whereby a flush top surface is provided interrupted only by the terminal posts and the filler plugs.

Another object of the invention is to provide a one piece cover for a multi-cell battery wherein the cell connectors are molded in the cover and wherein depressions, or wells, are provided at the external surface of the cover immediately adjacent the cell connectors so that burning of the connectors with associated terminal posts of the cell groups can be accomplished wherein the depressions, or wells, act as confining means for the molten metal.

Another object of the invention is to provide a manifold type vent which connects all of the cells and which is molded within the cover.

Further objects and advantages of the present invention will be apparent from the following description, reference being had to the accompanying drawings wherein preferred embodiments of the present invention are clearly shown.

In the drawings:

Figure 1 is a fragmentary view in perspective showing the cover in place on a storage battery.

Figure 2 is a section taken on line 2—2 of Figure 1.

Figure 3 is a section taken on line 3—3 of Figure 1.

Figure 5:
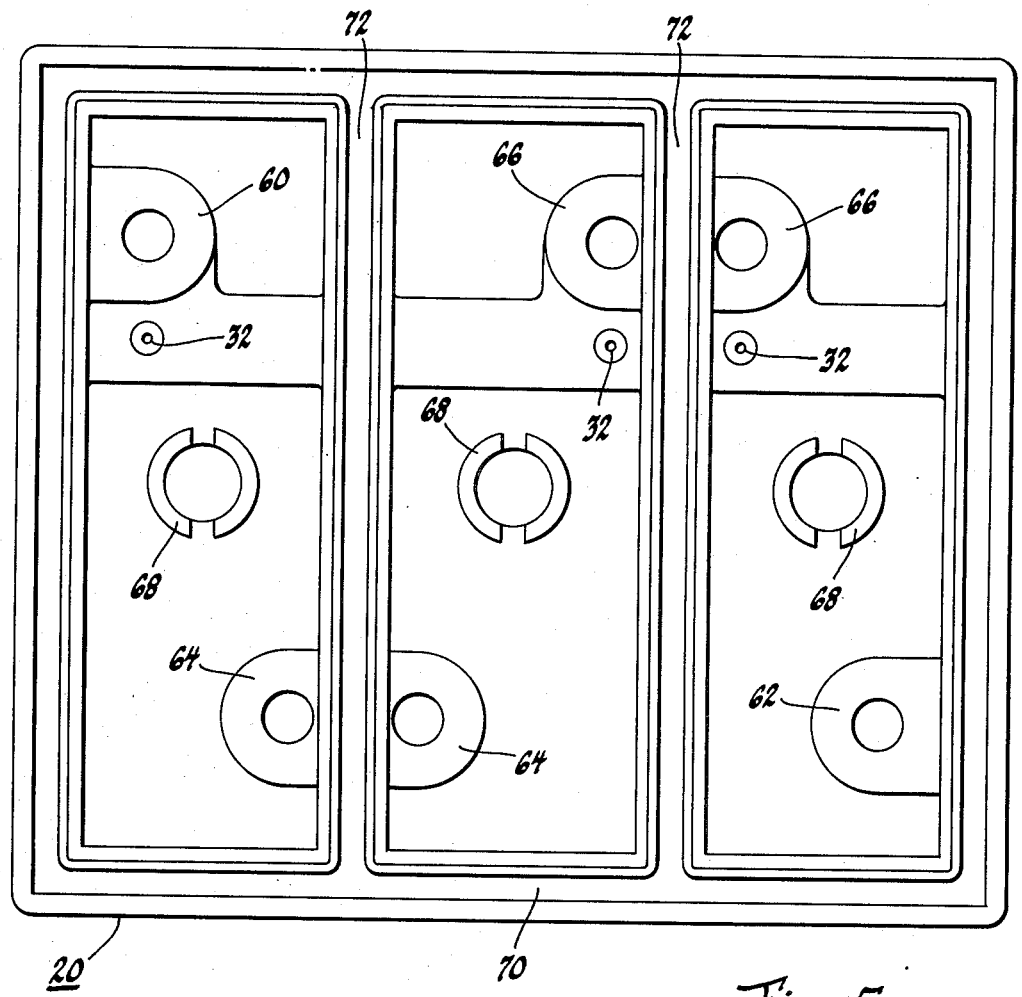
Figure 5 is a plan view of the bottom side of a battery box cover.

The present invention is directed to the use of a one piece cover wherein the cell connectors are embedded within the battery case cover and wherein each cell connector includes a reservoir or well therearound which will confine the lead alloy of the terminal post and connector when the two are joined by lead burning, welding or the like. After the assembly is complete, a sealing compound may be poured into the remainder of the depression and smoothed off to form a smooth top to the assembly. In place of sealing compounds, inserts may be snapped into place which interlock to cover the connectors. In either case, the connectors are not exposed to the atmosphere and do not oxidize or corrode providing a battery that is easier to care for and which is generally devoid of objectionable corrosive products at the exterior thereof.

It is understood that, while the present invention is disclosed in connection with a three cell storage battery, it may be used in any multi-cell battery with equal success.

Battery cases and covers are generally made from hard rubber, or other acid resisting material, which is molded and cured to form the case and cover. In conventional applications, the assembled cell groups wherein the plates are supported on connector bars having terminal or connector posts extending therefrom are placed in the cells and individual covers are passed thereover. These covers include terminal bushings molded therein which fit snugly over the terminal posts and are preferably tapered to assure a good electrical connection. Thereafter, the lead of the post and bushing is burned by means of a torch or welding current to form a good solid electrical connection therebetween.

In the present instance, the cell groups are placed in the cells of the battery case and then the cover is assembled thereto so that the connector posts pass through the several perforations in the cell connectors. Thereafter, the burning operation is carried out to form an assembled battery.

In more detail, a battery is shown at 18 having a cover 20 in Figure 1. This cover is shown in connection with a three cell battery and includes three filler openings 22 each fitted with a screw cap 24 for closing the openings. On opposite corners of the case are upstanding lead terminals 26 and 28 which pass through bushings 27. The posts are of opposite polarity for electrically connecting the battery 18 to a piece of equipment. Extending longitudinally of the cover is a vent passage 30 which passes transversely across the cells and connects through vent openings 32 to the interior of each cell. The vent passage 30 may include an elongated cover 34 which snaps into place and has one or more vent openings therein. This constitutes a manifold connection although it is understood that separate vents may be used for each cell or the venting may take place through the filler caps 24 if perforations are provided therein.

On the surface of the cover 20, two generally elliptical areas 36 and 38 are shown. These areas are adjacent the connector bars used for connecting the several cells.

Figure 4:
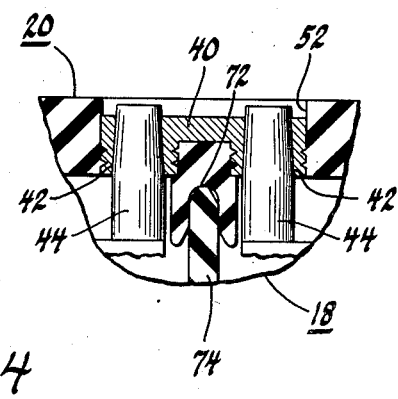
Figure 4 is a fragmentary view of a section of the cover prior to burning of the connector posts wherein the cover is assembled with the cell groups.

The connector bars are shown at 40 in Figure 3 and are short lengths of lead or lead alloy material including a perforation 42 at opposite ends thereof which perforations are adapted to receive connector posts 44 of cell groups. The posts 44 are preferably tapered as are the perforations to form a snug fit. In actual assembly, the posts 44 are longer than the depth of the connector perforations 42 as noted in Figure 4 and extend upwardly therefrom. However, upon metallurgically joining the connector bar with the connector posts the extending portions of the posts are melted down and flow over the connector bar 40 to positively electrically connect the bar with the posts. Since there is not sufficient lead or lead alloy in the exposed portion of the post to fill the cavity or well around the post and connector, a depression remains which may be filled with a sealing compound 50 as noted in Figure 2, if desired, or this filling may take the form of an insert made of acid resisting material.

The well, or depression, 52 is a vital part of this invention since it acts as a restricting means for preventing the molten lead from the posts from flowing away from the connector. This permits the burning operation to be carried out automatically whereas in past operations, this was a manual manipulation since great care had to be taken to maintain the molten lead in the desired position on top of the connector. In the present instance, no particular care need be taken since the molten lead may flow in any direction and will always be confined within the well, or depression, 52. It is, of course, apparent that if the exposed portions of the posts have sufficient volume that a substantial portion of the depression, or well, will be filled with molten lead which is permitted to solidify and form a heavy connector which is exposed or covered at the external surface of the battery cover, as desired.

Figure 5 shows the bottom side of the battery case cover 20. In this view, it will be noted that bosses are formed at 60 and 62 which are integrally molded with the cover and which receive the bushings 27 and terminal posts 26 and 28 of the battery while other bosses 64 and 66 are formed to receive the connectors 40 and their posts 44. The bosses 64 and 66 are at the internal surface of the cover adjacent the molded-in connectors. The vent openings are shown at 32 and are molded or drilled into the bosses 60 or 66 as the case may be. Downwardly extending skirts 68 are provided around the filler openings and are located generally centrally of each cell.

Around the external periphery of the cover 20 is a groove 70. This groove is connected by cross grooves 72 positioned so as to fall in line with partitions or dividers 74 in the battery case. When the battery is assembled, the grooves 70 and 72 are filled with a sealing compound, or cement, the cell groups are placed within several cells of the battery, and then the cover 20 is placed over the battery case and pressed downwardly thereon so that the connector terminals and terminal posts extend through the several connectors and bushings while portions of the battery case extend into the grooves 70 and 72 as noted in Figure 2. As pressure is applied, the sealing compound uniformly spreads within the grooves and around the mating portions of the case to form a tight seal to subsequently prevent the passage of gas or acid from one cell to the next and, likewise, to prevent any leakage from occurring external of the battery cells. After the assembly is completed, the connector terminals or posts may be burned to complete the battery assembly.

From the foregoing, it is manifest that the present battery case cover includes wells or depressions adjacent portions of the battery wherein lead burning is practiced. These depressions act as restricting means for maintaining the molten lead in position during the burning operation whereby automatic assembly processes can be carried out in lieu of the heretofore manual burning operations. It is understood that this burning may be accomplished by resistance welding or any other well known welding methods or may merely be carried out through the use of a gas flame torch directed at the portions to be melted or burned.

Another feature of this battery cover is the manifold system of venting wherein a single channel or vent passage is provided in the battery case cover which connects with the several cells and which preferably includes a cover that may be snapped into place so that the top of the battery presents an uninterrupted surface.

While the embodiments of the present invention as herein disclosed constitute preferred forms, it is to be understood that other forms might be adopted.

What is claimed is as follows:

1. For a multi-cell storage battery having a cell container of acid-resisting material in which cell groups are provided having plates supported on connector bars including terminal posts, a unitary molded cover construction, comprising, a one piece cover adapted to seal simultaneously the cell groups and having a flush top surface extending over all sides of the cell container and, interrupted only by the terminal posts and filler plugs, means forming filler openings and including split skirt portions extending downwardly into space adjacent each cell group, said one piece cover providing cooperating groove portions relative to the sides of the cell container for sealing therebetween, bosses formed by said cover and adapted to surround the terminal posts in spaced relation thereto, bushings filling space between said terminal posts and bosses, a plurality of imperforate and independent filler caps threadedly engaged in said cover, one of said caps being provided for each cell, wells formed in said cover below said flush top surface relative to which electrical connection is made between adjacent cell groups in sealed recess space, and means forming a single longitudinally extending vent passage as a manifold connection molded in said cover transversely of the cell groups and completely remote from said imperforate filler caps and filler openings therefor, said vent-passage forming means including an elongated cover which snaps into place relative to said unitary cover and which has at least one vent opening therein.

2. In a method for assembling a multi-cell storage battery having a cell container of acid-resisting material in which cell groups are provided having plates supported on connector bars including terminals, the steps comprising, positioning only a unitary molded cover with respect to the container so that sides and edges of the cover and container respectively are in dove-tailing sealed relation to each other, inductively heating extending portions of terminals for melting the same at least in part, confining molten metal of the terminals in recesses serving as restricting means to prevent molten material from flowing away, filling the recesses with a sealing compound to cover exposed conducting material, that forms an integral connector and terminal assembly, passing terminals to serve as connector posts through bushings provided in the unitary cover simultaneously with said positioning of the cover relative to the container, and closing off a single longitudinally extending vent passage by snapping in place an elongated cover member relative to the vent-passage which is molded into the cover and which completes a unitary manifold connection completely remote from filler openings for imperforate filler plugs relative to the unitary cover.

References Cited in the file of this patent
UNITED STATES PATENTS

| | | |
|---|---|---|
| 1,611,908 | Harley et al. | Dec. 28, 1926 |
| 1,633,224 | Ogden | June 21, 1927 |
| 1,990,445 | Younkman | Feb. 5, 1935 |
| 1,996,843 | Van Meter | Apr. 9, 1935 |
| 2,261,109 | Dunzweiler | Nov. 4, 1941 |
| 2,296,038 | King | Sept. 15, 1942 |
| 2,637,758 | Shannon | May 5, 1953 |

FOREIGN PATENTS

| | | |
|---|---|---|
| 623,711 | Great Britain | May 20, 1949 |